United States Patent [19]

Ishiwata et al.

[11] Patent Number: 4,615,175
[45] Date of Patent: Oct. 7, 1986

[54] HYDRAULIC RESERVOIR IN TANDEM MASTER CYLINDER

[75] Inventors: Ichiro Ishiwata, Kanagawa; Toshifumi Nishimura, Hyogo, both of Japan

[73] Assignee: Nippon Air Brake Co., Ltd., Kobe, Japan

[21] Appl. No.: 580,276

[22] Filed: Feb. 16, 1984

Related U.S. Application Data

[63] Continuation of Ser. No. 272,329, Jun. 10, 1981, abandoned.

[30] Foreign Application Priority Data

Jun. 14, 1980 [JP] Japan ............................. 55-83438[U]

[51] Int. Cl.$^4$ .............................................. F15B 7/00
[52] U.S. Cl. ....................................... 60/535; 60/562; 60/592; 264/318
[58] Field of Search ................. 60/562, 585, 592, 534, 60/535, 545; 264/318, 334

[56] References Cited

U.S. PATENT DOCUMENTS

| | | | |
|---|---|---|---|
| 3,545,206 | 12/1970 | Belart | 60/562 |
| 3,609,975 | 10/1971 | Lewis | 60/592 |
| 3,914,943 | 10/1975 | Lewis | 60/585 |
| 4,132,073 | 1/1979 | Ewald | 60/562 |
| 4,168,613 | 9/1979 | Nakagawa | 60/592 |
| 4,289,162 | 9/1981 | Nomura | 60/562 |
| 4,319,456 | 3/1982 | Kubota | 60/562 |
| 4,500,761 | 2/1985 | Kubota | 60/585 |
| 4,503,677 | 3/1985 | Crumb | 60/562 |

FOREIGN PATENT DOCUMENTS

| | | | |
|---|---|---|---|
| 2833228 | 2/1979 | Fed. Rep. of Germany | 60/592 |
| 0019059 | 2/1979 | Japan | 60/585 |
| 1231449 | 5/1971 | United Kingdom | |
| 1245126 | 9/1971 | United Kingdom | |
| 1446391 | 8/1976 | United Kingdom | |
| 2025548 | 1/1980 | United Kingdom | 60/562 |

*Primary Examiner*—Abraham Hershkovitz
*Attorney, Agent, or Firm*—McDougall, Hersh & Scott

[57] ABSTRACT

A hydraulic reservoir in a tandem master cylinder includes a main portion defining a fluid reservoir chamber for reserving brake fluid, two fluid supply portions defining fluid paths under the main portion, the fluid supply portions being contiguous with the main portion and an opening formed at the top, the two fluid supply portions being connected to two fluid connection portions of a tandem master cylinder body. The main portion is so shaped that one space defined by one cross section taken along one line normal to the central axis of the main portion, viewing from the top along the central axis is substantially equal to, or includes, another space defined by another cross-section taken along another line normal to the central axis of the main portion, the one cross-section being nearer the opening, and the fluid paths are so shaped that a further space defined by a futher cross-section taken along a further line normal to the central axis of the main portion at the bottom includes at least respective one parts of the cross-sections of the fluid paths at the bottom of the main portion.

20 Claims, 3 Drawing Figures

HYDRAULIC RESERVOIR IN TANDEM MASTER CYLINDER

This application is a continuation of application Ser. No. 272,329 filed June 10, 1981, now abandoned.

BACKGROUND OF THE INVENTION

1. Field of the Invention:

This invention relates to a hydraulic reservoir in a tandem master cylinder for a vehicle.

2. Description of the Prior Art:

Generally, a tandem master cylinder includes a hydraulic reservoir for reserving brake fluid. The hydraulic reservoir consists of a main portion defining a fluid reservoir chamber, and two brake fluid supply portions defining fluid paths respectively, and being formed under the main portion. The two brake fluid supply portions are contiguous with the mainportion. The fluid reservoir chamber of the main portion communicate with the fluid paths of the two brake fluid supply portions. The top of the main portion is formed as an opening. The two brake fluid supply portions are connected to brake fluid connection portions of a tandem master cylinder body, respectively. The fluid paths of the brake fluid supply portions communicate with fluid pressure generating chambers of the tandem master cylinder body. A cap is fitted to the opening of the main portion of the hydraulic reservoir. The reservoir is made of synthetic resin so that it is light, and the level of brake fluid in the reservoir can be observed from the exterior.

The hydraulic reservoir is relatively complicated in shape. In the manufacture of the hydraulic reservoir, an upper part including the opening, and a lower part including the brake fluid supply portions are separately formed, and the formed upper and lower parts are heat-welded with each other to obtain the hydraulic reservoir as one body. However, there are some problems on mechanical strength and reliability of sealing property in the welded portion of the thus obtained hydraulic reservoir. Further, the welding operation is inferior in productivity and labor efficiency.

SUMMARY OF THE INVENTION

Accordingly, it is an object of this invention to provide a hydraulic reservoir in a tandem master cylinder which can be manufactured without welding operation.

Another object of this invention is to provide a hydraulic reservoir in a tandem master cylinder by which the above-described problems can be solved.

In accordance with an aspect of this invention, a hydraulic reservoir in a tandem master cylinder which includes a main portion defining a fluid reservoir chamber for reserving brake fluid, two fluid supply portions defining fluid paths under said main portion, said fluid supply portions being contiguous with said main portion and an opening formed at the top, said two fluid supply portions being connected to two fluid connection portions of a tandem master cylinder body, in which said main portion is so shaped that one space defined by one cross section taken along one line normal to the central axis of said main portion, viewing from the top along the central axis is substantially equal to, or includes, another space defined by another cross-section taken along another line normal to the central axis of said main portion, said one cross-section being nearer said opening, and said fluid paths are so shaped that a further space defined by a further cross-section taken along a further line normal to the central axis of said main portion at the bottom includes at least respective one parts of the cross-sections of the said fluid paths at the bottom of said main portion.

The foregoing and other objects, features, and advantages of the present invention will be more readily understood upon consideration of the following detailed description of the preferred embodiment of the invention, taken in conjunction with the accompanying drawings.

DESCRIPTION OF THE PREFERRED EMBODIMENTS

Figure 1:
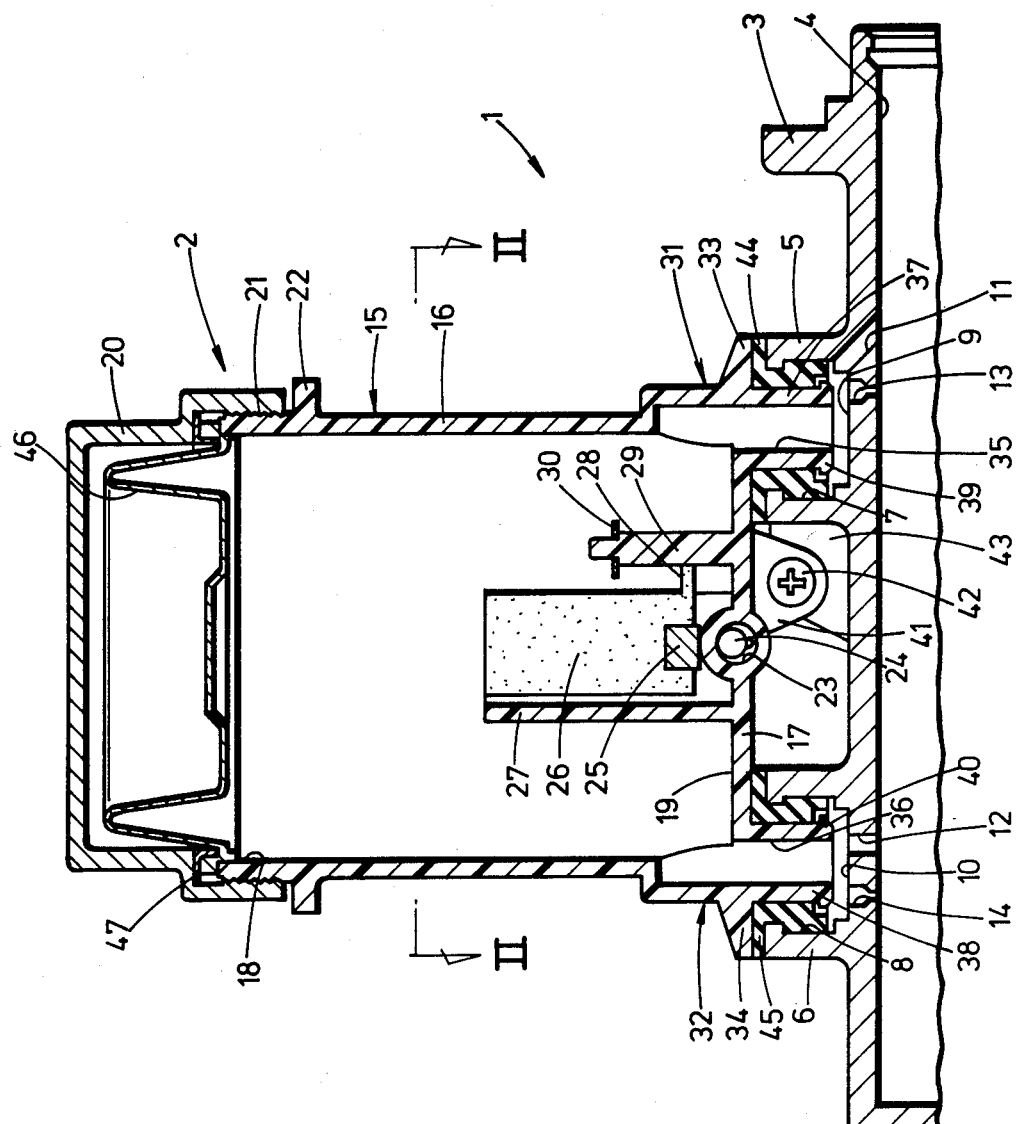
FIG. 1 is a partially broken front view of a tandem master cylinder which is provided with a hydraulic reservoir according to one embodiment of this invention.
Figure 2:
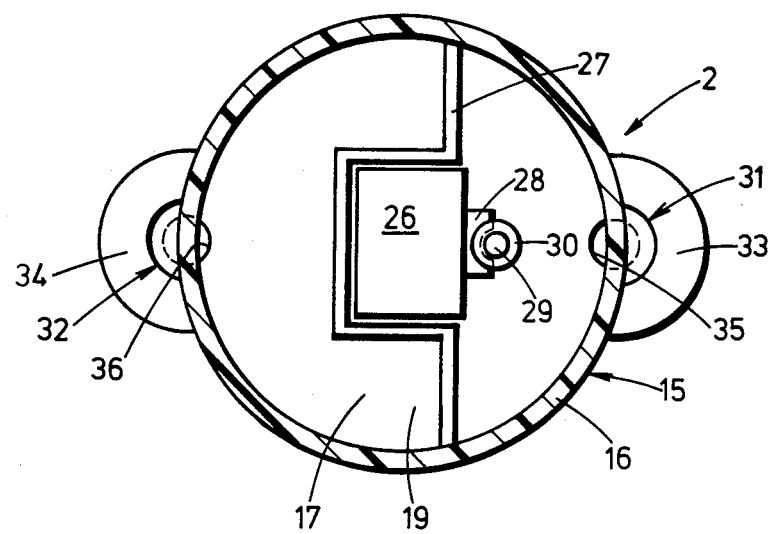
FIG. 2 is a cross-sectional view of the hydraulic reservoir taken along the line II—II on FIG. 1.

Referring to FIG. 1 and FIG. 2, a tandem master cylinder is generally denoted by a reference numeral 1. It consists of a brake fluid reservoir 2, and a tandem master cylinder body 3 to which the brake fluid reservoir 2 is connected.

In the tandem master cylinder body 3, a cylindrical bore 4 is formed to receive primary and secondary pistons (not shown). Primary and secondary pressurizing chambers are defined by the tandem master cylinder body 3 and the pistons. Bosses 5 and 6 as fluid connecting portions equal to each other in construction are formed in the upper wall of the master cylinder body 3, and they extend upwardly and are axially spaced by a predetermined distance from each other. Stepped holes 9 and 10 are formed in the bosses 5 and 6. The diameter of the intermediate portion of the stepped holes 9 and 10 is larger than the diameters of the upper and lower portions of the stepped holes 9 and 10. Compensation ports 11 and 12, and relief ports 13 and 14 are made in the bottom of the stepped holes 9 and 10. The primary and secondary pressurizing chambers of the master cylinder body 3 communicate through the compensation ports 11 and 12, and the relief ports 13 and 14 with the stepped holes 9 and 10. Since the functions of the compensation ports 11 and 12, and the relief ports 13 and 14 are well known, their description will be omitted.

The hydraulic reservoir 2 includes a substantially cylindrical main portion 15 formed of synthetic resin. The main portion 15 consists of a substantially cylindrical side wall 16 and a substantially disc-like bottom wall 17. An opening 18 is formed at the top of the cylindrical side wall 16. The inner diameter of the cylindrical side wall 16 is substantially constant within the range of the bottom wall 17 to the opening 18. However, the inner diameter of a portion of the side wall 16 nearer the opening 18 is very slightly larger than that of another portion of the side wall 16 nearer the bottom wall 17, due to draft taper for molding, so that a metal mold can be easily drawn out from the opening 18 of the main portion 15.

Thread 21 is formed in the outer surface of the top end portion of the cylindrical side wall 16. An internally threaded cap 20 formed of synthetic resin is engaged with the thread 21 of the side wall 16. A diaphragm 46 is fixed through a fixing ring 47 formed of synthetic resin and having inverted L-shaped cross-section to the cap 20 and main portion 15. The cap 20 may be vented. Projections 22 extending in the radial direction of the cylindrical side wall 16 are formed directly under the thread 21 in the outer surface of the side wall 16. The projections 22 are spaced by a suitable angular distance from each other. The side wall 16 is reinforced by the projections 22, and the cap 20 is prevented from being fastened too strongly to the main portion 15 by the projections 22.

A lateral hole 23 is formed in the bottom wall 17, extending from the front of the drawing paper (FIG. 1) to the back thereof. A well-known reed switch 24 is inserted into the lateral hole 23. The lower half of the inside of the reservoir 15 is partitioned by a crank-shaped wall 27. As clearly shown in FIG. 2, the crank-shaped wall 27 is integrally formed with the side wall 16 and the bottom wall 17, extending upwardly from the bottom wall 17. A float 26 made of foaming styrol is guided at the three side surfaces by the crank-shaped wall 27. A permanent magnet 25 is fixed on the lower surface of the float 26. FIG. 1 shows that the reservoir 15 is empty. Accordingly, the permanent magnet 25 contacts with the bottom surface 19 corresponding to the position of the reed switch 24. When the reservoir 15 contains a brake fluid, the float 26 floats in the brake fluid in accordance with the level of the brake fluid in the reservoir 15.

A lateral U-shaped projection 28 is integrally formed with the lower portion of the float 26. A post 29 is integrally formed with the bottom wall 17, extending upwardly from the bottom surface 19 and engaging with the lateral U-shaped projection 28 of the float 26. A stopper ring 30 is fixed on the top end portion of the post 29. Thus, the float 26 is prevented from rising to higher than a predetermined level. The stopper ring 30, as occasion demands, may be formed integrally with the post 29, and it may be C-shaped.

A level sensing device is constituted by the float 26, permanent magnet 25 and reed switch 24. When the brake fluid is so decreased that the permanent magnet 25 contacts with the bottom surface 19, the reed switch 24 is closed to energize warning means (not shown) such as a warning lamp or a buzzer.

In the reservoir 2, fluid supply portions 31 and 32 are further formed in the boundary between the bottom wall 17 and the side wall 16, corresponding to the fluid connecting portions 5 and 6 of the master cylinder body 3. Flanges 33 and 34 are integrally formed with the fluid supply portions 31 and 32, respectively, and they lie on an extension of the bottom wall 17. Fluid paths 35 and 36 are made in the fluid supply portions 31 and 32. Central axises of the fluid paths 35 and 36 are linear and normal to the bottom surface 19. Cylindrical portions 37 and 38 defining the fluid paths 35 and 36 extend downwardly from the bottom wall 17 and the flanges 33 and 34. Flanges 39 and 40 are formed integrally with the lower ends of the cylindrical portions 37 and 38, outwardly projecting in the radial direction of the cylindrical portions 37 and 38.

In the assembling operation of the tandem master cylinder 1, sealing members 44 and 45 made of rubber are tightly fitted to the stepped holes 9 and 10 of the bosses 5 and 6 of the master cylinder body 3. The cylindrical portions 37 and 38 of the fluid supply portions 31 and 32 of the reservoir 15 are tightly inserted into the central holes of the sealing members 44 and 45.

A tongue 41 is integrally formed with the bottom wall 17, extending downwardly from the latter. A lateral projection 43 is integrally formed with the one boss 5 of the master cylinder body 3. A bolt 42 is inserted into an opening (not shown) of the tongue 41, and screwed to the lateral projection 43. Thus, the reservoir 15 is firmly secured to the master cylinder body 3. Since construction and function of the sealing members 44 and 45 are well known, their description will be omitted.

Function and operation of the above-described reservoir 2 are similar to those of the conventional reservoir. However, in contrast to the conventional reservoir, the respective parts of the reservoir 2 are not formed integrally with each other by the heat-welding operation, but only by the molding operation. Accordingly, the problems on the deterioration of mechanical strength and sealing property due to the welding operation can be solved by the reservoir 2 of this embodiment. Since the welding operation can be omitted, the reservoir 2 is superior to the conventional reservoir in productivity and labor efficiency.

The outer shape of the reservoir 2 is obtained by a pair of metal molds the one of which is positioned in the front of the drawing paper of FIG. 1, and the other of which is positioned in the back of the drawing paper of FIG. 1. The inner shape of the reservoir 2 is obtained by another pair of metal molds the one of which is positioned above the drawing of FIG. 1 for forming the internal construction of the main portion 16, and the other of which is positioned under the drawing of FIG. 1 for forming the fluid paths 35 and 36. Thus, the main portion 16 and the fluid supply portions 31 and 32 being integral with the main portion 16 are manufactured almost by the metal molding method. The welding operation is unnecessary. As occasion demands, the produced reservoir 2 may be subjected to surface treatment such as burr-removing.

Figure 3:
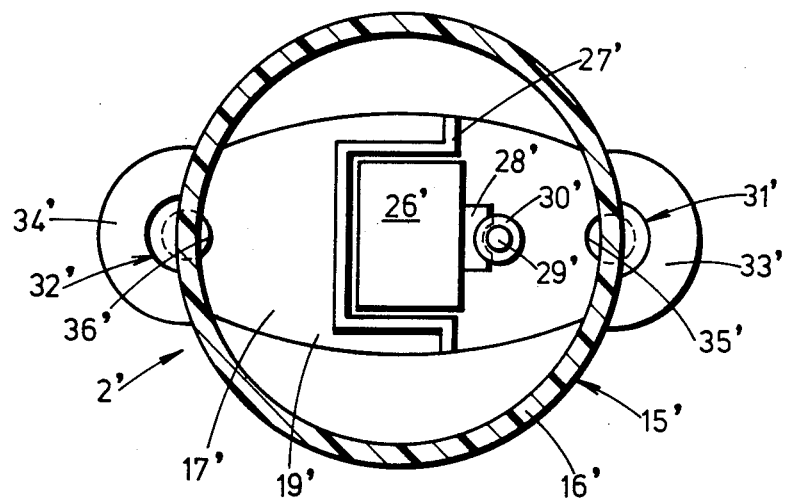
FIG. 3 is a cross-sectional view of a hydraulic reservoir according to another embodiment of this invention, similar to FIG. 2.

FIG. 3 shows another embodiment of this invention, similar to FIG. 2. Parts in FIG. 3 which are similar to, or correspond to, those in FIG. 2, are denoted by the same reference numerals with dash.

In this embodiment, an upper part of a main portion 15', nearer the opening 18 (not shown in FIG. 3), is circular in cross section, while a lower part of the main portion 15' is generally elliptic or oval in cross section. The cross section of the intermediate part between the upper part and lower part is transitional between circular and elliptic. Thus, the intermediate part of the main portion 15' is tapered towards the lower part thereof. Respective parts of cross sections of fluid paths 35' and 36' are included in the space defined by the cross section of the main portion 15' at its bottom surface 19', and they are opposite to each other in the longer axis of the ellipse.

When spaces defined by cross sections of the main portion 15', taken along two arbitrary lines normal to the central axis of the main portion 15', are compared with each other, the one of the spaces nearer the opening is equal to, or includes the other of the spaces nearer the bottom surface 19'. Accordingly, the upper metal mold for forming the inner shape of the main portion 15' can be easily removed or parted from the opening of the main portion 15'.

As described in the above embodiments, the main portion 15 or 15' is so shaped that one space defined by one cross-section taken along one line normal to the central axis of the main body 15 or 15', viewing from the top along the central line, substantially coincides with, or includes another space defined by another cross-section taken along another line normal to the central axis of the main portion 15 or 15', where the one cross-section is nearer the opening 18 than the other cross-section. Accordingly, the upper metal mold for forming the inside of the main portion 15 or 15' can be easily parted from the opening 18 of the main portion 15 or 15'. On the other hand, the fluid paths 35 or 35' and 36 or 36' are so shaped that a further space defined by a further cross-section taken along a further line normal to the central axis of the main portion 15 or 15' at the bottom includes at least respective one parts of the cross-sections of the fluid parts 35 or 35', and 36 or 36' at the bottom of the main portion 15 or 15', as clearly shown in FIG. 2 or FIG. 3. The central axises of the fluid paths are linear. Accordingly, the lower metal mold for forming the inside of the fluid supply portions 31 or 31' and 32 or 32' can be easily parted from the openings of the fluid supply portions 31 or 31' and 32 or 32'. As occasion demands, the upper and lower metal molds may consist of plural metal mold sections, respectively.

The outer shape of the reservoir 2 or 2' can be obtained by two metal molds which are positioned leftwards and rightwards in FIG. 1, or in the front and back of the drawing paper of FIG. 1. The metal mold for forming the outer shape of the reservoir 2 or 2', as occasion demands, may consist of more than two metal mold sections. However, preferably it consists of two metal mold sections.

While the preferred embodiments have been described, variations thereto will occur to those skilled in the art within the scope of the present inventive concepts which are delineated by the following claims.

For example, in the above-embodiments, the partition wall 27 or 27' is crank-shaped in cross section, and the chamber defined by the main portion 15 or 15' is divided into two by the partition wall 27 or 27'. Instead, the partition wall may consist of a cylindrical wall portion extending upwardly from the center of the bottom surface 19 or 19', and two plane wall portions extending radially from the cylindrical wall portion and extending upwardly from the bottom surface 19 or 19' so that the chamber defined by the main portion 15 or 15' is divided into three. The float is inserted into the cylindrical wall portion which may be provided with a suitable stopper, a cut-out portion or a slit.

Further in the above embodiments, the thread 21 is formed on the side wall 16, and the cap 20 is screwed to it. Instead, the cap 20 may be combined with the main portion 15 by a click method or bayonet method. Or the thread 21 may be partially formed on the side wall 16, not on the whole periphery of the side wall 16.

Further in the above embodiments, the plural lateral projections 22 are formed on the side wall 16, spaced angularly from each other. However, one lateral projection or a flange may be formed on the whole periphery of the side wall 16.

Further, the diaphragm 46 may be omitted, and the shape or construction of the cap 20 is not limited to the embodiment.

Further, in the embodiments, the central axises of the fluid paths 35 and 36 are parallel to the central axis of the main portion 15. However, the former may be inclined to the latter.

Further, in the above embodiments, the reservoir 2 or 2' is made of synthetic resin. However, it may be formed of other material, for example, of metal.

Further, in the above embodiments, the reservoir 2 or 2' is fixed to the tandem master cylinder body 3 by means of the tongue 41, bolt 42 and the lateral projection 43 formed integrally with the boss 5. However, the reservoir 2 or 2' may be fixed to the tandem master cylinder body 3 without them in some cases.

What is claimed is:

1. An integral seamless molded hydraulic reservoir for a tandem master cylinder including a main portion defining a fluid reservoir chamber along a central axis for reserving brake fluid, the main portion being open at its upper end and defining a bottom at its lower end, means for covering the open upper end of the main portion to preclude loss of fluid from the main portion chamber, the interior cross-section of the upper end of the chamber being equal to or greater than the interior cross-section of the lower end of the chamber whereby the chamber is adapted for the outward axial passage of an inside forming mold; two integral fluid supply portions defining fluid paths communicating with said fluid reservoir chamber and including a section extend downwardly generally below a plane defined by the bottom of the main portion, the fluid supply portions being open at their lower ends, the fluid paths defining axes therealong, the interior cross-section of the lower end of the fluid supply portions being equal to or greater than the interior cross-section of the upper end of the fluid supply portions whereby the supply portions are adapted for the outward axial passage of an inside forming mold, the fluid supply portions spaced for connections to two fluid portions of a tandem master cylinder body and extending radially outwardly from the reservoir axis beyond an outer surface of the reservoir chamber thereby defining a lateral section of the fluid supply portion interconnection the main resevoir above its bottom with the section of the fluid portion extending below the plane of the reservoir bottom thereby providing a seamless molded reservoir of reduces cross-section.

2. A hydraulic reservoir according to claim 1, in which the central axes of said fluid paths are parallel to each other.

3. A hydraulic reservoir in a tandem master cylinder according to claim 2, in which the central axes of said fluid paths are normal to the bottom of said main portion.

4. A hydraulic reservoir according to claim 1, in which said fluid reservoir chamber defined by said main portion is partitioned by an upwardly extending wall formed integrally with the bottom of said main portion.

5. A hydraulic reservoir according to claim 4, in which a float provided with a permanent magnet is guided by a part of said upwardly extending wall.

6. A hydraulic reservoir according to claim 4, in which said upwardly extending wall is crank-shaped.

7. A hydraulic reservoir according to claim 6, in which a float provided with a permanent magnet is guided at the three side surfaces by said crank-shaped wall.

8. A hydraulic reservoir according to claim 7, in which an upwardly extending post is integrally formed with the bottom of said main portion, and a stopper portion is integrally formed with the top end portion of said post, said float being slidably engaged with said post and being prevented from rising to higher than a predetermined level by said stopper portion.

9. A hydraulic reservoir according to claim 7, in which an upwardly extending post is integrally formed with the bottom of said main portion, a stopper ring is fixed on the top end portion of said post, and a lateral U-shaped projection is formed integrally with the lower portion of said float, said U-shaped projection being slidably engaged with said post and said float being prevented from rising to higher than a predetermined level by said stopper ring.

10. A hydraulic reservoir according to claim 1, in which semi-circular flanges are integrally formed with said two fluid supply portions, respectively.

11. A hydraulic reservoir according to claim 1, in which a lateral bore is formed in the bottom of said main portion, and a reed switch is inserted into said lateral bore.

12. A hydraulic reservoir according to claim 1, in which a tongue member is formed integrally with the bottom of said main portion, extending downwardly, said reservoir being fixed through said tongue member to said tandem master cylinder.

13. A hydraulic reservoir according to claim 1, in which a thread is formed in the top end portion of said main portion, and a cap is engaged with said thread to cover said fluid reservoir chamber of the main portion.

14. A hydraulic reservoir according to claim 13, in which a lateral projection is formed integrally with said main portion, directly under said thread.

15. A hydraulic reservoir according to claim 1, in which the cross-sections of said fluid paths are circular.

16. A hydraulic reservoir according to claim 1, in which the internal cross-section of said main portion is circular.

17. A hydraulic reservoir according to calim 16, in which said portions of the fluid paths extending radially beyond the reservoir outer surface are diametrically opposite to each other.

18. A hydraulic reservoir according to claim 17, in which the internal cross-section of said main portion is tapered towards the bottom.

19. A hydraulic reservoir according to claim 1, in which the internal cross-section of the upper part of said main portion is circular, and the bottom of said main portion is generally elliptical, wherein the interior cross-section of the lower part of said main portion is tapered towards the bottom of said main portion.

20. A hydraulic reservoir according to claim 19, in which said portions of the fluid paths extending radially beyond the reservoir outer surface are opposite to each other in the longer axis of said elliptical bottom.

* * * * *